ELECTRONIC CIRCUIT FOR SELECTIVELY CONNECTING A TRANSMITTER AND A RECEIVER TO A SINGLE ANTENNA

Filed Sept. 18, 1964

Inventors
John W. Battin
Daniel B. Walker Jr.
BY Mueller & Aichele
Attys.

3,327,215

ELECTRONIC CIRCUIT FOR SELECTIVELY CONNECTING A TRANSMITTER AND A RECEIVER TO A SINGLE ANTENNA

John W. Battin, Naperville, and Daniel B. Walker, Jr., Bellwood, Ill., assignors to Motorola, Inc., Franklin Park, Ill., a corporation of Illinois Filed Sept. 18, 1964, Ser. No. 397,500
14 Claims. (Cl. 325—23)

This invention relates to switching circuits for selectively connecting a transmitter and a receiver to an antenna, and more particularly to such a switching circuit including solid state switching elements.

In two-way radio communication equipment, it is known practice to use a single antenna for the transmitter and receiver, and to use a mechanical switching device, such as a relay, for selectively connecting the transmitter and receiver to the antenna. Mechanical switching devices have the disadvantage however that failure may occur because of deterioration of the contacts, and wear, breakdown or misadjustment of mechanical parts. Further, considerable energy is required for actuating relay contacts for switching coaxial cables as may be required for connecting a transmitter and receiver to an antenna.

It has been proposed to use solid state switching circuits including diodes or other semiconductor switching devices for selectively connecting a transmitter and a receiver to an antenna. However, problems arise in that the diodes do not completely disconnect one of the elements from the antenna, and objectionable coupling may occur. Another problem is that the diodes have significant resistance when conducting, and this may be reflected into other elements to produce substantial loading of the units. A further problem has been that the diodes are non-linear devices having capacity which varies with the voltage applied thereacross, and this acts to produce harmonics which form disturbing signals.

It is, therefore, an object of the present invention to provide an improved solid state antenna switching circuit.

Another object of the invention is to provide a solid state switching circuit for selectively connecting a transmitter and a receiver to the same antenna, wherein the transmitter and receiver can be effectively disconnected from the antenna without objectionable loading of the circuit.

A further object of the invention is to provide a circuit using diodes for selectively coupling a transmitter and receiver to an antenna, wherein harmonic generation of the diodes is minimized.

A feature of the invention is the provision of a circuit for coupling a transmitter and receiver to an antenna wherein the receiver is coupled to the antenna through a diode and the transmitter is coupled to the antenna through a quarter wave line, with a second diode connected between the transmitter end of the line and ground. The diodes are selectively rendered conducting to couple the receiver to the antenna and decouple the transmitter therefrom, and non-conducting to couple the transmitter to the antenna through the quarter wave line and to decouple the receiver therefrom.

Another feature of the invention is the provision of a circuit for coupling a receiver to an antenna including a pair of diodes connected in opposed relation so that the variable capacity effect of the two diodes tends to cancel out and harmonic generation is reduced. The two diodes can be connected in parallel to thereby provide less insertion loss between the antenna and the receiver, or in series so that the cancellation of the effect of the variable capacity is greater.

Another feature of the invention is the provision of a circuit for connecting a transmitter and receiver to an antenna including diodes which are rendered conducting to connect the receiver and disconnect the transmitter, and non-conducting to connect the transmitter and isolate the receiver, with the diodes and bias voltages applied thereto being selected so that the diodes have extremely low impedance when conducting.

The invention is illustrated in the drawings wherein.

In practicing the invention an antenna coupling circuit is provided including a low pass filter connected to the antenna and a transmitter circuit portion and a receiver circuit portion connected to the input of the low pass filter. The transmitter circuit portion includes a quarter wave line connected between the transmitter and the filter. At the input of the line, a diode is connected to ground to selectively short the input end of the line so that the quarter wave line forms an open circuit at the antenna end. The receiver coupling portion includes a diode which is selectively rendered conducting to connect the receiver to the input of the filter and which is rendered nonconducting to isolate the receiver. The two diodes are simultaneously rendered conducting and non-conducting to cause either the receiver or the transmitter to be coupled and the other to be isolated. In the receiver coupling portion, a second diode can be connected in the circuit with opposite polarity, so that the capacities of the two diodes vary in opposite directions with changes in the radio frequency (RF) voltage thereacross, and their effects tend to cancel out. This reduces the harmonics generated by the receiver coupling portion, and the low pass filter further reduces these harmonics. The second diode can be connected in parallel across the first diode and DC isolated therefrom by capacitors, and this reduces the insertion loss to the receiver since the two diodes are conducting at the same time and connected in parallel between the receiver and the filter. The second diode may be connected in series with the first diode, and the capacity of the two diodes in series are in RF opposition so that when the RF voltage is increasing the capacity of one diode it is decreasing the capacity of the other. This results in lower capacity changes with changes in RF voltage so that the harmonic generation is further reduced.

Figure 1:
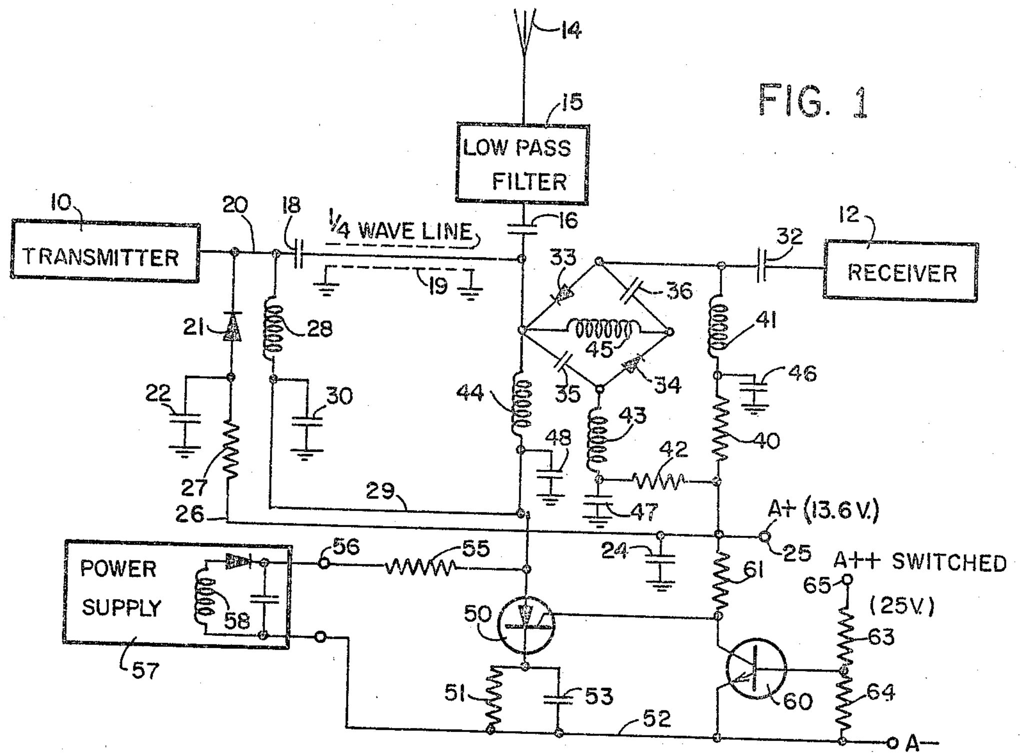
FIG. 1 is a circuit diagram of the coupling circuit of the invention.

Referring now to the antenna connecting circuit of FIG. 1, the transmitter 10 and receiver 12 are selectively coupled to the antenna 14. The connection to antenna 14 is through a low pass filter 15 and a capacitor 16 which isolates the antenna from the direct current switching circuit. The transmitter and receiver may operate within a given band of frequencies, as for example, from 150 to 175 megacycles. The low pass filter in such case will be designed to attenuate frequencies above 175 megacycles.

The transmitter coupling portion of the circuit includes a direct current isolating capacitor 18 and a coaxial line 19. The coaxial line has a length substantially equal to a quarter wave length at the frequency involved. For the frequency band mentioned the line may be provided by a section of RG–58A/U cable which is 12¼ inches long. The connection 20 from the transmitter to the input of line 19 is selectively grounded by a circuit including diode 21 and capacitor 22. The diode 21 is of the type having low forward resistance at the frequencies involved and having high back resistance when large bias potential is applied thereacross. Diodes having this characteristic may have an inductive effect at the frequency involved, and capacitor 22 may be selected to resonate out the inductance of the diode 21. It may be desirable in some applications to make capacitor 22 variable. Therefore, only the resistive part of the diode forward impedance shunts the quarter wave line when the diode is forward biased. This small resistive part of the diode impedance is reflected at the opposite end of the quarter wave line as a very high impedance. Positive potential from terminal 25 is applied through conductor 26 and resistor 27 to the anode of diode 21. This may be a potential of the order of 13 volts. A direct current path is established from the cathode of diode 21 through choke coil 28 and conductor 29. The conductor 29 is selectively connected to A— reference (or ground potential) to render diode 21 conducting, or to a much higher positive potential than that at terminal 25 to cut off the diode 21. The action of the circuit to provide this potential will be completely described. Capacitor 30 provides a bypass for the conductor 29, and capacitor 24 provides a bypass for conductor 26.

Considering now the receiver coupling portion, the receiver 12 is coupled to the antenna through direct current isolating capacitor 32 and diode 33. Connected in parallel with diode 33 and with opposite polarity is a second diode 34, which is DC isolated from diode 33 by capacitors 35 and 36. The positive potential from terminal 25 is applied through resistor 40 and choke coil 41 to the anode of diode 33, and through resistor 42 and choke coil 43 to the anode of diode 34. Capacitors 46 and 47 provide RF bypass. The cathode of diode 33 is connected through choke coil 44 to the conductor 29. The cathode of diode 34 is connected through choke coils 44 and 45 to the conductor 29. As previously stated, this conductor is selectively connected to ground, and this renders the diodes 33 and 34 conducting. When a bias potential is applied to conductor 29 which is a higher positive potential than that at terminal 25, the diodes are cut off. Capacitor 48 provides additional bypass for conductor 29.

Considering now the circuit for selectively applying different potentials to conductor 29, it will be apparent that conductor 29 is connected through gate controlled silicon rectifier 50 and the parallel combination of resistor 51 and capacitor 53 to the minus power supply or ground conductor 52. Accordingly, when silicon controlled rectifier 50 is conducting, the conductor 29 is grounded. The conduction of the silicon controlled rectifier is controlled by transistor 60. The transistor 60 has its collector electrode connected to the gate electrode of the gate controlled silicon rectifier 50 and through resistor 61 to the terminal 25 which provides a positive potential. The emitter electrode of the transistor is connected to conductor 52, and the base electrode is connected to an intermediate point on the voltage divider formed by resistors 63 and 64. This voltage divider is connected between terminal 65, which provides a voltage only when the transmitter is operated, and the ground conductor 52. The voltage at terminal 65 which is switched may be of the order of 25 volts.

The conductor 29 is also connected through resistor 55 to terminal 56 of power supply 57. The power supply 57 is energized only during transmission, and the voltage applied to terminal 65 (A++ switched) may be derived from this power supply. Also, when the power supply is operating, an alternating current signal is derived from transformer coil 58 and rectified to provide a high positive potential at terminal 56. This potential may be of the order of 200 volts.

Considering now the operation of the system, in the normal condition the receiver 12 is connected to the antenna 14, and terminal 65 is not energized. The transistor 60 is non-conducting and the gate controlled rectifier 50 is conducting to ground the conductor 29, due to gate current from point 25 through resistor 61. This applies the potential between terminal 25 and ground across the diode 21 in the transmitter circuit portion, and the diodes 33 and 34 in the receiver circuit portion so that these diodes all conduct. Diodes 33 and 34 provide a connection from the receiver to the antenna, and the diode 21 shorts the quarter wave line 19, so that it forms an open circuit at the transmitter to disconnect the transmitter.

When transmission is initiated, as by operation of a transmission push-to-talk switch, the power supply 57 is energized and the switched voltage is applied to terminal 65 to render transistor 60 conducting. This effectively grounds the gate electrode of the controlled rectifier 50 to turn off the rectifier so that conductor 29 is isolated from ground. The positive potential at terminal 56 when the power supply is energized is applied through resistor 55 to conductor 29, and through choke 28 to the cathode of diode 21. This potential is also applied through chokes 44 and 45 to the cathodes of diodes 33 and 34, and acts to cut off all three diodes. Diode 21 is now essentially an open circuit to ground so that the transmitter output is coupled through the quarter wave line to the antenna. Diodes 33 and 34 are also essentially open circuits and isolate the receiver 12 from the antenna. The choke 45 acts to parallel resonate with the capacity of diodes 33 and 34 so that a detuned receiver cannot form a series resonant circuit with the diode capacity to shunt transmitter RF power.

During transmitter operation, the bypass condensers 30 and 48 are charged to the voltage at terminal 56 which, as previously stated, may be a relatively high voltage such as 200 volts. When the potential is removed from terminals 54 and 65 at the termination of transmission, transistor 60 is turned off and gate controlled silicon rectifier 50 is rendered conducting. The charge on capacitors 30 and 48 will tend to discharge through rectifier 50 to produce a high voltage spike across resistor 51. This voltage is applied through the gate control electrode of the rectifier 50 across the emitter and collector electrodes of transistor 60. To prevent this voltage from reaching a value sufficiently high to damage the transistor 60, capacitor 53 is provided across resistor 51. This acts to limit the voltage developed across resistor 51 and applied across the emitter and collector electrodes of transistor 60 so that danger of second breakdown and consequent destruction of transistor 60 is prevented.

As previously stated, the diodes used for connecting the receiver to the antenna, and for shorting the line connecting the transmitter to the antenna, should have very low impedance when conducting. Diodes are available which have a forward impedance of the order of 2 ohms at a frequency of 175 megacycles when utilized in the circuit as illustrated. These diodes also have high back impedance when a large cut off bias is applied thereto. As previously stated, a bias of the order of 200 volts is used to render the diodes non-conducting. The diodes necessarily have capacity when reverse biased, and the capacity changes with the RF voltage thereacross. This acts to produce harmonics which are undesired. By connecting two diodes with opposite polarities, the variations in the capacities thereof are in opposite directions and tend to cancel out, and this greatly reduces the generation of harmonics.

In the circuit of FIG. 1, the oppositely connected diodes 33 and 34 result in a reduction of second harmonic generation of the order of 20 decibels as compared to the use of a single diode connected as the diode 33. Further reduction of harmonics is produced by the low pass filter 15 which may reduce the second harmonic by any amount depending on filter design. However, to provide a filter which acting alone would provide the desired reduction of the second harmonic would involve a very expensive filter construction. Although the diode 21 connected to the transmission line 19 in the transmitter portion of the coupling circuit also produces harmonics, these have been at a level such that the low pass filter 15 renders them unobjectionable. A parallel or series diode network such as used for receiver isolation could be used for the diode 21 circuit and thereby reduces the attenuation requirement of the low pass filter.

Figure 2:
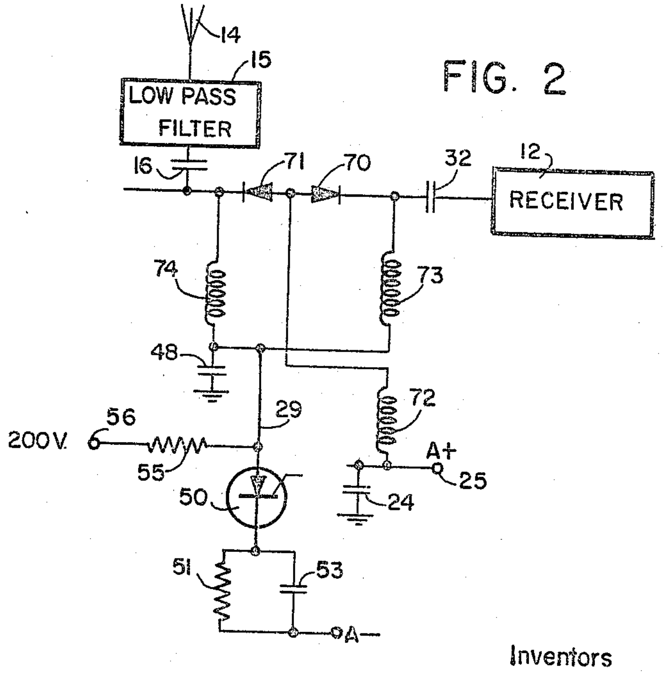
FIG. 2 illustrates an alternate embodiment of the circuit of FIG. 1.

As previously stated, the receiver coupling portion may include two diodes connected in series rather than in parallel as shown in FIG. 1. This arrangement is illustrated in FIG. 2 which illustrates just that part of the circuit which is different from FIG. 1. The parts which are the same as in FIG. 1 are given the same reference numerals. The receiver 12 is connected through capacitor 32 and diodes 70 and 71 and through capacitor 16 and low pass filter 15 to the antenna 14. The anodes of the diodes 70 and 71 are connected to the terminals 25 through choke 72. The cathode of diode 70 is connected through choke 73, and the cathode of diode 71 is connected through choke 74, to the conductor 29 which is selectively grounded or connected to a high positive potential.

As described in connection with FIG. 1, conductor 29 is grounded during reception, as gate controlled silicon rectifier 50 is conducting. When the transmitter operates and gate controlled silicon rectifier 50 is non-conducting, a potential of the order of 200 volts is applied to conductor 29 from resistor 55 connected to terminal 56 of the power supply 57 (FIG. 1). Accordingly, during reception the positive potential applied to the anodes of diodes 70 and 71 renders these diodes conducting, and during transmission the higher positive potential applied from terminal 56 to the cathodes of these diodes renders the diodes non-conducting.

The diodes 70 and 71 connected in series have less capacity than either diode alone. The variable capacity produced by the diodes as the voltage thereacross changes is also less. Further, the capacity of the two diodes varies in opposite directions because the polarity of the diodes is reversed, so that the harmonics generated by the diodes is greatly reduced. Therefore, the two diodes connected in series provide better reduction of harmonics than is provided by two diodes connected in parallel. However, the insertion loss is less for diodes connected in parallel than for diodes connected in series.

The system of the invention has been found to be very effective for selectively connecting a receiver and a transmitter of two-way radio equipment to a single antenna. No mechanically moving parts are required so that there is no problem of wear or mechanical adjustment. In the system described the receiver or transmitter which is operating is connected to the antenna with small insertion loss, and the element not connected does not objectionably load the circuit or interfere with the desired operation.

We claim:

1. A circuit for selectively connecting a transmitter and a receiver operating in a predetermined frequency band to a single antenna including in combination, low pass filter means for attenuating signals above the predetermined frequency band and having an output adapted to be connected to the antenna and an input, a receiver circuit portion connected to said input of said filter means and including a diode, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a second diode for shorting such circuit, and potential supply means connected to said first and second diodes for applying thereto a first bias voltage of the polarity for rendering said first and second diodes conductive to couple the receiver to said filter means and to effectively disconnect the transmitter from said filter means, said potential supply means selectively applying to said first and second diodes a second bias voltage substantially greater than said first bias voltage and of opposite polarity thereto to render said first and second diodes non-conducting and thereby couple the transmitter to said filter means and effectively disconnect the receiver from said filter means.

2. A circuit for selectively connecting a transmitter and a receiver operating in a predetermined frequency band to a single antenna including in combination, a receiver circuit portion adapted to be connected to said antenna and including a diode, a transmitter circuit portion including a transmission line having a length substantially equal to a quarter wave length in the predetermined frequency band and having an input adapted to be connected to the transmitter and an output adapted to be connected to the antenna, a circuit connected from said input of said transmission line to a reference potential including a second diode for shorting such circuit, and potential supply means connected to said first and second diodes for applying thereto bias voltages to render the same conducting to couple the receiver to the antenna and to effectively disconnect the transmitter from the antenna, said potential supply means including solid state switch means connected to said first and second diodes to selectively apply thereto further bias voltages to render said diodes non-conducting to couple the transmitter to the antenna and to effectively disconnect the receiver from the antenna.

3. A circuit for selectively connecting a transmitter and a receiver operating in a predetermined frequency band to a single antenna including in combination, low pass filter means for attenuating signals above the predetermined frequency band and having an output adapted to be connected to the antenna and an input, a receiver circuit portion connected to said input of said filter means and including a diode, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a second diode and a capacitor connected in series therewith for shorting such circuit, and potential supply means connected to the anodes of said first and second diodes for applying thereto a first positive bias voltage, said potential supply means including solid state switch means connected to the cathodes of said first and second diodes to selectively apply thereto a reference potential and a second positive bias voltage substantially greater than said first bias voltage, whereby said diodes are rendered conducting in response to connection of said cathodes thereof to the reference potential to couple the receiver to said filter means and to effectively disconnect the transmitter from said filter means, and said diodes are rendered non-conducting in response to the application of said second bias voltage to said cathodes thereof to couple the transmitter to said filter means and effectively disconnect the receiver from said filter means.

4. A circuit for selectively connecting a transmitter and a receiver operating in a predetermined frequency band to a single antenna including in combination, low pass filter means for attenuating signals above the predetermined frequency band and having an output adapted to be connected to the antenna and an input, a receiver circuit portion having a first terminal adapted to be connected to the receiver and a second terminal connected to said input of said filter means and including first and second diodes connected with opposite polarities between said first and second terminals, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a third diode for shorting such circuit, and potential supply means connected to said first, second and third diodes for applying thereto first bias voltages for rendering said diodes conductive to couple the receiver to said filter means and to effectively disconnect the transmitter from said filter means, said potential supply means selectively applying to said first, second and third diodes second bias voltages for rendering said first, second and third diodes non-conducting, and thereby couple the transmitter to said filter means and effectively disconnect the receiver from said filter means.

5. A circuit for selectively connecting a transmitter and a receiver operating in a predetermined frequency band to a single antenna including in combination, low pass filter means for attenuating signals above the predetermined frequency band and having an output adapted to be connected to the antenna and an input, a receiver circuit portion having a first terminal adapted to be connected to the receiver and a second terminal connected to said input of said filter means and including first and second diodes connected with opposite polarities between said first and second terminals, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a third diode for shorting such circuit, and potential supply means connected to corresponding electrodes of said first, second and third diodes for applying thereto a bias voltage of the polarity to render the same conducting, said potential supply means including solid state switch means connected to the opposite electrodes of said first, second and third diodes to selectively apply thereto a reference potential and a second bias voltage substantially greater than said first bias voltage, whereby said diodes are rendered conducting in response to connection of said opposite electrodes thereof to the reference potential to couple the receiver to said filter means and to effectively disconnect the transmitter from said filter means, and said diodes are rendered non-conducting in response to the application of said second bias voltage thereto to couple the transmitter to said filter means and effectively disconnect the receiver from said filter means.

6. A circuit for selectively connecting a transmitter and a receiver operating in a predetermined frequency band to a single antenna including in combination, low pass filter means for attenuating signals above the predetermined frequency band and having an input and an output adapted to be connected to the antenna, a receiver circuit portion having a first terminal adapted to be connected to the receiver and a second terminal connected to said input of said filter means, said receiver circuit portion including first and second diodes connected in parallel between said terminals with opposite polarities, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a third diode for shorting such circuit, and potential supply means connected to said first, second and third diodes for applying thereto a first bias voltage of the polarity for rendering said diodes conductive to couple the receiver to said filter means and to effectively disconnect the transmitter from said filter means, said potential supply means selectively applying to said first, second and third diodes a second bias voltage substantially greater than said first bias and of polarity to render said first, second and third diodes nonconducting and thereby couple the transmitter to said filter means and effectively disconnect the receiver from said filter means.

7. A circuit for selectively connecting a transmitter and a receiver operating in a predetermined frequency band to a single antenna including in combination, low pass filter means for attenuating signals above the predetermined frequency band and having an input and an output adapted to be connected to the antenna, a receiver circuit portion having a first terminal adapted to be connected to the receiver and a second terminal connected to said input of said filter means, said receiver circuit portion including first and second diodes connected in parallel between said terminals with opposite polarities, a transmitter circuit portion including a transmission line having a length substantially equal to a quarter wave over the predetermined frequency band and having an input adapted to be connected to the transmitter and an output connected to said input of said filter means, a circuit connected from said input of said transmission line to a reference potential including a third diode and a capacitor connected in series therewith for shorting such circuit, and potential supply means connected to corresponding electrodes of said first, second and third diodes for applying thereto a bias voltage of the polarity to render the same conducting, said potential supply means including solid state switch means connected to the opposite electrodes of said first, second and third diodes to selectively apply thereto a reference potential and a second bias voltage substantially greater than said first bias voltage, whereby said diodes are rendered conducting in response to connection of said opposite electrodes thereof to the reference potential to couple the receiver to said filter means and to effectively disconnect the transmitter from said filter means, and said diodes are rendered non-conducting in response to the application of said second bias voltage thereto to couple the transmitter to said filter means and effectively disconnect the receiver from said filter means.

8. A circuit for selectively connecting a transmitter and a receiver operating in a predetermined frequency band to a single antenna including in combination, low pass filter means for attenuating signals above the predetermined frequency band and having an input and an output adapted to be connected to the antenna, a receiver circuit portion having a first terminal adapted to be connected to the receiver and a second terminal connected to said input of said filter means, said receiver circuit portion including first and second diodes connected in series opposing relation between said first and second terminals, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a third diode for shorting such circuit, and potential supply means connected to said first, second and third diodes for applying thereto a first bias voltage of the polarity for rendering said diodes conductive to couple the receiver to said filter means and to effectively disconnect the transmitter from said filter means, said potential supply means selectively applying to said first, second and third diodes a second bias voltage substantially greater than said first bias and of polarity to render said first, second and third diodes non-conducting and thereby couple the transmitter to said filter means and effectively disconnect the receiver from said filter means.

9. A circuit for selectively connecting a transmitter and a receiver operating in a predetermined frequency band to a single antenna including in combination, a receiver circuit portion having a first terminal adapted to be connected to the receiver and a second terminal adapted to be connected to the antenna and including first and second diodes connected with opposite polarities between said first and second terminals, a transmitter circuit portion having an input adapted to be connected to the transmitter and an output adapted to be connected to the antenna and including a third diode for shorting such transmitter circuit portion, and potential supply means connected to said first, second and third diodes for applying thereto first bias voltages for rendering said diodes conductive to couple the receiver to the antenna and to short said transmitter circuit portion and effectively disconnect the transmitter from the antenna, said potential supply means selectively applying to said first, second and third diodes second bias voltages for rendering said first, second and third diodes non-conducting, and thereby couple the transmitter to the antenna and effectively disconnect the receiver from the antenna.

10. A circuit for selectively connecting a receiver operating in a predetermined frequency band to an antenna including in combination, a first terminal adapted to be connected to the receiver and a second terminal adapted to be connected to the antenna, first and second diodes each having an anode and a cathode, circuit means connecting said first and second diodes in parallel with opposite polarities for signal flow between said terminals, said circuit means including direct current blocking means connecting said anode of said second diode to said cathode of said first diode and connecting said cathode of said second diode to said anode of said first diode, bias means connected to said anodes and said cathodes of said first and second diodes and applying first direct current potentials thereto for holding said anodes positive with respect to said cathodes so that said diodes conduct simultaneously to couple the receiver to the antenna, said bias means including switch means operative to supply second direct current potentials to said anodes and said cathodes for holding said cathodes positive with respect to said anodes for rendering said diodes non-conducting to effectively disconnect the receiver from the antenna.

11. A circuit in accordance with claim 10 wherein said bias means includes a coil effectively connected in parallel with said first and second diodes and forming a parallel resonant circuit with the capacity of said diodes when said diodes are non-conducting.

12. A circuit for selectively connecting a transmitter and a receiver operating in a predetermined frequency band to a single antenna, and wherein said transmitter includes power supply means and switch means for energizing the same for transmitter operation, said circuit including in combination, a receiver circuit portion adapted to be connected to the antenna and including a first diode, a transmitter circuit portion including a transmission line having a length substantially equal to a quarter wave length in the predetermined frequency band and having an input adapted to be connected to the transmitter and an output adapted to be connected to the antenna, a circuit connected from said input of said transmission line to a reference potential including a second diode for shorting such circuit, and potential supply means connected to corresponding electrodes of said first and second diodes for applying thereto a first bias voltage, said potential supply means including conductor means connected to the opposite electrodes of said first and second diodes, first capacitor means connecting said conductor means to the reference potential, gate controlled rectifier means selectively connecting said conductor means to the reference potential through parallel connected resistor means and second capacitor means, said gate controlled rectifier means being normally conducting to connect said conductor means to the reference potential to thereby render said diodes conducting to couple the receiver to the antenna and to effectively disconnect the transmitter from the antenna, transistor means connected to said gate controlled rectifier means for rendering the same non-conducting, means coupled to the transmitter switch means for rendering said transistor means conducting in response to actuation of the switch means to energize the power supply, and means coupled to the power supply means of the transmitter for deriving a second bias voltage substantially greater than said first bias voltage and applying the same to said conductor means, whereby operation of the switch means renders said gate controlled rectifier means non-conducting so that said second bias voltage is applied to said diodes to render the same non-conducting and thereby couple the transmitter to the antenna and effectively disconnect the receiver from the antenna.

13. A circuit for selectively connecting a transmitter and a receiver operating in a predetermined frequency band to a single antenna, and wherein said transmitter includes power supply means and switch means for energizing the same for transmitter operation, said circuit including in combination, low pass filter means for attenuating signals above the predetermined frequency band and having an output adapted to be connected to the antenna and a input, a receiver circuit portion connected to said input of said filter means and including first and second diodes connected with opposite polarities, a transmitter circuit portion including a transmission line having a length substantially equal to a quarter wave length in the predetermined frequency band and having an input adapted to be connected to the transmitter and an output connected to said input of said filter means, a circuit connected from said input of said transmission line to a reference potential including a third diode and first capacitor means connected in series therewith for shorting such circuit, and potential supply means connected to the anodes of said first, second and third diodes for applying thereto a first positive bias voltage, said potential supply means including conductor means connected to the cathodes of said first, second and third diodes, second capacitor means connecting said conductor means to the reference potential, a gate controlled silicon rectifier and parallel connected resistor means and third capacitor means for selectively connecting said conductor means to the reference potential, said gate controlled silicon rectifier being normally conducting to connect said conductor means to the reference potential to thereby render said diodes conducting to couple the receiver to said filter means and to effectively disconnect the transmitter from said filter means, transistor means connected to said gate controlled silicon rectifier for rendering the same non-conducting, means coupled to the transmitter switch means for rendering said transistor means conducting in response to actuation of the switch means to energize the power supply, and means coupled to the power supply means of the transmitter for deriving a second positive bias voltage substantially greater than said first bias voltage and applying the same to said conductor means, whereby operation of the switch means renders said gate controlled silicon rectifier non-conducting so that said second bias voltage is applied to said cathodes of said diodes to render said diodes non-conducting and thereby couple the transmitter to said filter means and effectively disconnect the receiver from said filter means, the second bias voltage being stored by said second capacitor means and producing a voltage across said parallel connected resistor means and third capacitor means when said gate controlled silicon rectifier conducts, with said third capacitor means acting to limit the voltage developed thereacross.

14. A circuit for selectively connecting a transmitter and a receiver operating in a predetermined frequency band to a single antenna, and wherein said transmitter includes switch means for energizing the same for transmitter operation, said circuit including in combination, a receiver circuit portion adapted to be connected to the antenna and including a first diode, a transmitter circuit portion adapted to be connected to the antenna and including a second diode, and potential supply means including conductor means connected to said first and second diodes, and gate controlled rectifier means and resistor means connected to said conductor means, said gate controlled rectifier means being normally in one conducting state to render said diodes conducting to couple the receiver to the antenna and to effectively disconnect the transmitter therefrom, transistor means connected to said gate controlled rectifier means for causing the same to change conducting states, means coupled to the transmitter switch means for rendering said transistor means conducting in response to actuation of the switch means to change said gate controlled rectifier means to a second conducting state to apply a second bias voltage to said diodes to render said diodes non-conducting and thereby couple the transmitter to the antenna and effectively disconnect the receiver therefrom.

References Cited

UNITED STATES PATENTS

| | | | |
|---|---|---|---|
| 2,485,606 | 10/1949 | Kandoian | 325—23 |
| 3,095,538 | 6/1963 | Silberstein | 325—37 X |
| 3,117,241 | 1/1964 | Paynter et al. | 325—21 |
| 3,131,365 | 4/1964 | Hoover | 333—7 |

OTHER REFERENCES

"The Diode Switch" Stover and Earnshaw, in CQ February 1961, pages 36–39.

DAVID G. REDINBAUGH, *Primary Examiner.*

B. V. SAFOUREK, *Assistant Examiner.*